United States Patent [19]

Usdan

[11] E Re. 29,572

[45] Reissued Mar. 14, 1978

[54] PROCESS FOR THE MANUFACTURE OF YARN AND THE RESULTING PRODUCT

[75] Inventor: Melvin Usdan, Woodmere, N.Y.

[73] Assignee: Perfect Thread Company, Inc., Valley Stream, N.Y.

[21] Appl. No.: 758,660

[22] Filed: Jan. 12, 1977

Related U.S. Patent Documents

Reissue of:

[64] Patent No.: 3,879,928
Issued: Apr. 29, 1975
Appl. No.: 411,786
Filed: Nov. 1, 1973

[51] Int. Cl.[2] ..... D01H 13/26; D01H 3/00

[52] U.S. Cl. ..... 57/157 TS; 57/140 R

[58] Field of Search ..... 57/34 HS, 140 R, 140 BY, 57/144, 157 R, 157 TS, 157 MS, 157 F, 160

[56] References Cited

U.S. PATENT DOCUMENTS

| | | | |
|---|---|---|---|
| 3,098,348 | 7/1963 | Bryner | 57/157 TS |
| 3,157,982 | 11/1964 | Alexandre | 57/157 TS |
| 3,316,705 | 5/1967 | Nava | 57/157 TS |
| 3,399,524 | 9/1968 | Koizumi | 57/157 TS |
| 3,462,933 | 8/1969 | Nava | 57/157 TS X |
| 3,522,700 | 8/1970 | Fisher | 57/157 TS |
| 3,582,445 | 6/1971 | Okuhashi | 57/157 AS X |
| 3,696,078 | 10/1972 | Smith et al. | 57/157 AS UX |
| 3,733,801 | 5/1973 | Jones | 57/157 TS |

*Primary Examiner*—Donald Watkins
*Attorney, Agent, or Firm*—Darby & Darby

[57] ABSTRACT

[A process for manufacturing a balanced synthetic yarn, i.e., a yarn having relatively no torque, including the steps of conventionally texturizing yarn formed of thermoplastic filaments, subjecting the yarn to a subsequent heat treatment, and twisting the yarn with a relatively low twist in the opposite direction from the twist imparted to the yarn during the texturizing process.]

*A process for the preparation of low-torque textile yarn by imparting high twist to a thermo plastic yarn in one direction and heat setting, detwisting to impart an opposite torque to the yarn, applying a second heat setting to the yarn and then low twisting the yarn in the direction of the torque.*

18 Claims, No Drawings

PROCESS FOR THE MANUFACTURE OF YARN AND THE RESULTING PRODUCT

Matter enclosed in heavy brackets [ ] appears in the original patent but forms no part of this reissue specification; matter printed in italics indicates the additions made by reissue.

BACKGROUND OF THE INVENTION

This invention relates to a process for the manufacture of yarn and more particularly to a process for manufacturing a balanced yarn formed of a synthetic, thermoplastic material.

In order to provide fabric products exhibiting desirable properties, e.g., high stretch characteristics with retentivity of shape despite washing, dry cleaning, etc., yarn texturizing processes have been developed for treating the yarns of which these fabric products are to be made.

A conventional method of texturizing thermoplastic yarns generally utilizes twisting and heat-setting techniques. Essentially, a measured high twist is imparted to the yarn (the amount of twist depending upon the denier or thickness of the yarn), the yarn is heat-set in the twisted condition in a high pressure steam autoclave for a predetermined amount of time, and finally the yarn is reversely twisted to a predetermined amount. As a result, the torque or tendency to twist back to its heat-set condition causes the filaments of the yarn to bulk up into a spring-like condition which results in a desirable high-stretch yarn.

Unfortunately, after this conventional texturizing technique is applied, the yarn has a tendency to kink when being knitted into fabric products. This tendency results from the torque retained in the yarn which gives it the beneficial high-stretch and bulk characteristics. Such kinking prevents the effective use of such yarn for knitted goods since these goods tend to become distorted due to the relatively high degree of kinking. Such kinking is particularly disadvantageous for use in sewing, where it is necessary for the yarn to pass through needles, with controlled tensions.

Several methods of reducing torque in texturized yarn are currently known. For example, one common method of mitigating the kinking in yarn is to combine the yarn (having for example an S-twist) with another yarn treated in the same manner, but twisted in an opposite direction (i.e., a Z-twist), to produce a multi-ply yarn. The yarns so plied, respectively having an S-twist and a Z-twist, compensate one another so that the resultant yarn has practically no directional torque. This process is disadvantageous in that two separate processes must be performed on two individual strands of yarn of one-half the denier desired in the finished yarn.

Another method of reducing torque without plying comprises high-twisting the texturized yarn in a direction opposite to that of the first high-twisting, heat-setting it and untwisting the same. This process is advantageous in that, because it does not use a plying technique, a fine denier product can be obtained. However, this process has not been found to be completely advantageous since there remains enough residual torque in the yarn so as to make the yarn unsuitable for use in sewing.

SUMMARY OF THE INVENTION

Accordingly, one object of this invention is to provide a simple and advantageous process for manufacturing a balanced yarn, particularly suitable for sewing.

Another object of the present invention is to provide a yarn manufacturing process which yields an improved balanced unplied yarn.

Still another object is to provide a process for the manufacture of a low torque, balanced yarn which is suitable for knitting, weaving and sewing.

In accordance with a preferred embodiment of this invention, these and other objects are attained by texturizing a yarn of thermoplastic filaments by subjecting it to a high twist in one direction (for example, in the S-direction), heat-setting the yarn in its twisted condition and then untwisting the yarn (in the example, in the Z-direction) as is conventional. It is noted that this texturizing process may be carried out by a false-twisting process, which is the well-known process by which yarn is continuously passed through a heating zone and is set therein while being continuously high-twisted to a predetermined extent and detwisted. After this conventional texturizing, the yarn is subjected to a heat-setting process wherein the yarn is placed in a pressurized steam environment for a predetermined time at a temperature within a predetermined range. The yarn is dried and a twist imparted to the yarn in a direction opposite to the first twist used in the texturizing step (i.e., opposite the assumed S-direction, that is, in the Z-direction) or, using different terminology, in the same direction as the torque which has remained in the yarn. The yarn may then be lubricated with an antistatic lubricant and wound onto cones.

DESCRIPTION OF THE PREFERRED EMBODIMENT

It should be understood that the details of the process described below may be varied depending on the particular yarn being treated. The term "yarn" is meant to include single or multi-filament fibers which filaments have been twisted together and intertwined to form long strands. The particular disclosed process has been applied to a 36 filament, 150 denier, polyester yarn which may be obtained on the market with from about 0 to ½ turns per inch residual twist in the S or Z-direction.

The texturizing process, as mentioned hereinabove, may be carried out through the conventional twist, heat-set, untwist method or may be imparted to the yarn via the false-twisting procedure. In any event, a high twist (1,800–4,500 turns per meter depending upon the particular yarn) of about 2,400 turns per meter in the S-direction is initially imparted to the yarn. (Of course, the initial high twist could just as well be in the Z-direction which would necessitate reversing all subsequently described twist direction.) The yarn is set in this twisted condition by immersing it in a steam atmosphere at a temperature of about 250° C, at a pressure of about 35 to 50 pounds per square inch for a period of between about ½ to 2 hours. Finally, the yarn is detwisted in the Z-direction, preferably to a remaining twist of about zero.

The above described process is a typical yarn texturizing method. The degree of twist and heat-setting parameters may be varied to suit the particular yarn and to impart different desired physical characteristics to the yarn. Although this process results in a yarn having desirable high stretch, elasticity, and bulk characteristics, it leaves an undesirable high torque within the yarn due to its tendency to spring back to the highly twisted state in which it was heat-set. It is this high torque characteristic that the process of the present invention eliminates thereby yielding a balanced yarn (i.e., one with negligible torque) still having the desirable characteristics imparted thereto during the conventional texturizing procedure.

After the yarn has been texturized, it is subjected to a second heat-setting procedure, which in the preferred embodiment comprises a series of alternating heating and vacuum treatments. It is noted, however, that although this procedure is preferably one which includes a series of heating and vacuum treatments, it has been found that satisfactory results are obtained by a single step, as described below.

The preferred additional heat-set procedure is carried out after the yarn has been wound onto cones, the yarn having a tension normally associated with cone-wound yarn. The texturized yarn is treated as follows: (a) steam for about 4 minutes in an autoclave at 25 to 30 p.s.i. pressure at about 250° C, (b) extract the yarn from the autoclave and expose it to the ambient atmosphere for about 2 minutes, (c) steam for about 5 minutes at 25 to 30 p.s.i. pressure at about 250° C. (d) extract from the autoclave and expose the yarn to the ambient atmosphere for about 2 minutes, (e) subject the yarn to a low vacuum (about 28 inches of mercury) for about 5 minutes, (f) extract for about 1 minute, (g) steam for about 25 minutes at 25 to 30 p.s.i. pressure at about 250° C, (h) extract for about 1 minute, and (i) subject to vacuum for about 5 minutes.

The yarn is then dried in a drying oven for about 4 hours at about 170° C. Following drying, the yarn is subjected to a low twist of about 150 turns per meter in a direction determined by the direction of the initial high twist imparted to the yarn during the conventional texturizing part of the process. This direction is determined as follows. It has been assumed that the initial high twist was in the S-direction. As noted above, after the texturizing process including the initial high S-twist, the heat-set in the twisted condition, and the reverse twist steps is completed, the yarn tends to return to its high twisted condition. If the initial high twist is in the S-direction, the texturized yarn will have what is known as a Z-torque associated with it. (If in the initial texturizing process a high Z-twist was initially imparted to the yarn, the remaining torque would be in the S-direction). Subsequent to the second heat-setting procedure, a low twist of about 150 turns per meter is applied in the same direction as the remaining torque in the yarn. In other words, the low twist is applied in a direction opposite to the direction of the initial high twist. Of course, the magnitude of this low twist is dependent upon the particular case. It has been found, however, that a twist of between 100 to 200 turns per meter in the appropriate direction is sufficient for most situations.

As mentioned above, although the described series of heating and vacuum steps is preferred, a single step may be substituted for them with satisfactory results being obtained. Thus, the texturized yarn may be wet heat-set at a temperature of between about 200° – 300° C for between about ¼ to 1 hour. This procedure, when followed by the low twist described above, yields a balanced, low torque yarn.

The texturized yarn thus obtained in accordance with the above-described process of this invention has a significantly reduced torque relative to existing texturized synthetic yarns. After treatment with a silicone-oil solution, the yarn is suitable for knitting and weaving. Although it has been the usual case to treat the yarn with lubricant so that 2–4 percent of the weight of the finished product comprises the lubricant, it has been found that a modified treatment whereby 7–9 percent of the weight of the finished yarn comprises the silicone-oil results in a yarn especially suitable for sewing in that the heat generated due to friction with the sewing needle may be dissipated. The increased oil application may be accomplished by increasing the speed of the conventional lubricant application rollers. Of course, any of the usual oil solutions may be used, but silicone-oil has proven to be most effective. The application of the finished yarn to sewing is further enhanced by the fact a multi-filament yarn may easily be threaded onto a sewing needle without crimping or kinking. If the yarn is broken, the filament ends tend to remain together rather than separate, so that the needle-threading operation is facilitated.

It is understood that various modifications can be made in the process described above, depending upon the particular weight and material of the thread. Further, the second heat-treating procedure described above may be accomplished other than as specifically described. For example, instead of subjecting the yarn to the alternating heat and vacuum treatment described in detail above, the yarn may be heated in a double heater where a first heater attains a temperature of about 200° C at the top with a second setting box at about 180° C.

Obviously, numerous other modifications and variations of the present invention are possible in the light of the above teachings. It is therefore to be understood that within the scope of the appended claims, the invention may be practiced otherwise than as specifically described herein.

What is claimed is:

1. A process for the preparation of low-torque textile yarn comprising, imparting a high twist to a thermoplastic yarn in one direction, heat-setting the yarn in the high twist condition, detwisting the yarn so that a torque in the direction opposite to said high twist is imparted thereto, applying a second heat-setting to the yarn, and thereafter imparting a low twist in the same direction as said torque to the yarn.

2. A process as recited in claim 1 wherein said low twist is of the order of about 100 to 200 turns per meter of yarn.

3. A process as recited in claim 1 wherein said second heat-setting is accomplished at a temperature of the order of about 200° to 300° C for a time of the order of about ¼ to 1 hour.

4. A process as recited in claim 1 wherein said second heat-setting includes a series of steps including the steps of heating under pressure, exposing the yarn to the ambient atmosphere, and subjecting the yarn to a vacuum atmosphere.

5. A process as recited in claim 1 further including the step of applying an anti-static silicone oil solution to said yarn subsequent to imparting the low twist to the yarn.

6. A process as recited in claim 5 wherein said yarn is coated with said silicone-oil solution so that the weight of the finished yarn comprises 7 to 9 percent of said silicone-oil.

7. A process as recited in claim 1 wherein said second heat-setting includes the steps of steaming for about 4 minutes at about 250° C, exposing the yarn to the ambient atmosphere for about 2 minutes, steaming for about 5 minutes at about 250° C, exposing the yarn to the ambient atmosphere for about 2 minutes, subjecting the yarn to a vacuum for about 5 minutes, exposing the yarn to the ambient atmosphere for about 1 minute, steaming for about 25 minutes at about 250° C, exposing the yarn to the ambient atmosphere for about 1 minute and subjecting the yarn to vacuum for about 5 minutes.

8. A process as recited in claim 1 wherein said low twist is of the order of about 150 turns per meter.

9. A synthetic thermoplastic yarn manufactured according to the process of claim 1.

*10. A process for the preparation of low-torque textile yarn suitable for sewing comprising the steps of imparting a high twist to a thermoplastic yarn in one direction, heat-setting the yarn in the high-twist condition, de-twisting the yarn so that a residual torque in the direction opposite to that of said high twist is produced, applying a second heat-setting to the yarn, and thereafter imparting to the yarn a low twist in a direction opposite to that of said high twist.*

*11. A process as recited in claim 10 wherein said low twist is of the order of about 100–200 turns per meter of yarn.*

*12. A process as recited in claim 10 wherein said second heat-setting is accomplished at a temperature of the order of about 200°–300° C for a time of the order of about ¼ to one hour.*

*13. A process as recited in claim 10 wherein said second heat-setting includes a series of steps including the steps of heating under pressure, exposing the yarn to the ambient atmosphere, and subjecting the yarn to a vacuum atmosphere.*

*14. A process as recited in claim 10 further including the step of applying an anti-static oil solution to said yarn subsequent to imparting the low twist to the yarn.*

*15. A process as recited in claim 14 wherein said yarn is coated with a silicone oil so that the weight of the finished yarn comprises 7–9 percent of said silicone oil.*

*16. A process as recited in claim 10 wherein said yarn is single-ply.*

*17. A process as recited in claim 10 wherein said low twist is of the order of about 150 turns per meter.*

*18. A synthetic thermoplastic yarn manufactured according to the process of claim 10.*

* * * * *